(12) United States Patent
Horne et al.

(10) Patent No.: US 7,474,996 B2
(45) Date of Patent: Jan. 6, 2009

(54) METHOD OF PROCESSING GEOPHYSICAL DATA

(75) Inventors: Stephen Horne, Brighton (GB); Richard Bale, Calgary (CA)

(73) Assignee: WesternGeco L.L.C., Houston, TX (US)

( * ) Notice: Subject to any disclaimer, the term of this patent is extended or adjusted under 35 U.S.C. 154(b) by 622 days.

(21) Appl. No.: 10/484,469

(22) PCT Filed: Jul. 17, 2002

(86) PCT No.: PCT/GB02/03354

§ 371 (c)(1), (2), (4) Date: Sep. 3, 2004

(87) PCT Pub. No.: WO03/009005

PCT Pub. Date: Jan. 30, 2003

(65) Prior Publication Data

US 2005/0033476 A1     Feb. 10, 2005

(30) Foreign Application Priority Data

Jul. 18, 2001   (GB) ................................ 0117589.2

(51) Int. Cl.
*G06F 17/50* (2006.01)
*G01V 1/00* (2006.01)

(52) U.S. Cl. ................................ 703/2; 702/14; 702/18

(58) Field of Classification Search .............. 702/14, 702/18; 367/75, 36, 41, 38, 40, 21, 23; 703/2, 703/14, 18
See application file for complete search history.

(56) References Cited

U.S. PATENT DOCUMENTS 4,803,666 A * 2/1989 Alford ......................... 367/36

(Continued)

FOREIGN PATENT DOCUMENTS

FR     2 703 469     3/1993

(Continued)

OTHER PUBLICATIONS

International Search Report dated Nov. 4, 2002 (PCT/ GB 02/ 03354).

(Continued)

*Primary Examiner*—Paul L Rodriguez
*Assistant Examiner*—Nithya Janakiraman
(74) *Attorney, Agent, or Firm*—Ari Pramudji; Liangang (Mark) Ye; Jeffrey E. Griffin (57) ABSTRACT

A method of processing geophysical data including determining the azimuth of a mirror symmetry plane within the earth from the geophysical data having sets of geophysical data acquired with different source-receiver azimuths. The data are processed to determine attributes of the geophysical data that are azimuth-dependent. One azimuth-dependent attribute of the geophysical data is selected, and a value of the source-receiver azimuth about which the selected attribute exhibits mirror symmetry is determined. This locates a mirror symmetry plane within the earth. The value of the source-receiver azimuth may be determined by generating an objective function indicative of the difference between the actual value of an attribute at one azimuth and the value predicted for that attribute at that azimuth using a trial estimate of the azimuth of a mirror symmetry plane, and finding the azimuth of a mirror symmetry plane that minimizes the objective function.

40 Claims, 5 Drawing Sheets

U.S. PATENT DOCUMENTS

| | | | | |
|---|---|---|---|---|
| 5,343,441 A | * | 8/1994 | Alford | 367/75 |
| 5,508,973 A | | 4/1996 | Mallick et al. | 367/38 |
| 5,532,978 A | * | 7/1996 | Corrigan | 367/75 |
| 5,999,486 A | * | 12/1999 | DeVault | 367/36 |

FOREIGN PATENT DOCUMENTS

FR              2703469 A1 * 10/1994

OTHER PUBLICATIONS

Busby, "The effectiveness of azimuthal apparent-resistivity measurements as a method for determining fracture strike orientations," *European Association of Geoscientists & Engineers*, pp. 677-695 (2000).

Grechka and Tsvankin, "3-D moveout velocity analysis and parameter estimation for orthorhombic media," *Geophysics*, vol. 64, No. 3; pp. 820-837 (May-Jun. 1999).

Sayers, "Misalignment of the orientation of fractures and the principal axes for 1 $P$ and $S$ waves in rocks containing multiple non-orthogonal fracture sets," *Geophys. J. Int.*, 133, pp. 459-466 (1998).

Sayers and Dean, "Azimuth-dependent AVO in reservoirs containing non-orthogonal fracture sets," *Geophysical Prospecting*, 49, pp. 100-106 (2001).

Bale et al., "Analysis and stacking of 3-D converted wave data in the presence of azimuthal anisotropy," *SEG Expanded Abstracts*, pp. 1189-1192, 2000.

Garotta and Granger, "Acquisition and processing of 3C X 3-D data using converted waves," *SEG Expanded Abstracts*, pp. 995-997, 1988.

Grechka and Tsvankin, "3-D description of normal moveout in anisotropic media," *SEG Expanded Abstracts*, pp. 1487-1490, 1996.

\* cited by examiner

Azimuthal angle ⟶

METHOD OF PROCESSING GEOPHYSICAL DATA

BACKGROUND OF THE INVENTION

This is a nationalization under 35 U.S.C. § 371 of International Application PCT/GB02/03354, filed under the Patent Cooperation Treaty on Jul. 17, 2002, claiming priority to Application Serial No. 0117589.2, filed in Great Britain on Jul. 18, 2001. Accordingly, we claim priority under 35 U.S.C. § 119 to Application Serial No. 0117589.2, filed in Great Britain on Jul. 18, 2001.

FIELD OF THE INVENTION

The present invention relates to a method of processing geophysical data, in particular to a method of processing geophysical data to determine information relating to azimuthal anisotropy in the geophysical data. Information about the earth's interior, for example relating to fractures within the earth or reflector dip, may then be obtained.

DESCRIPTION OF THE RELATED ART

Figure 1:
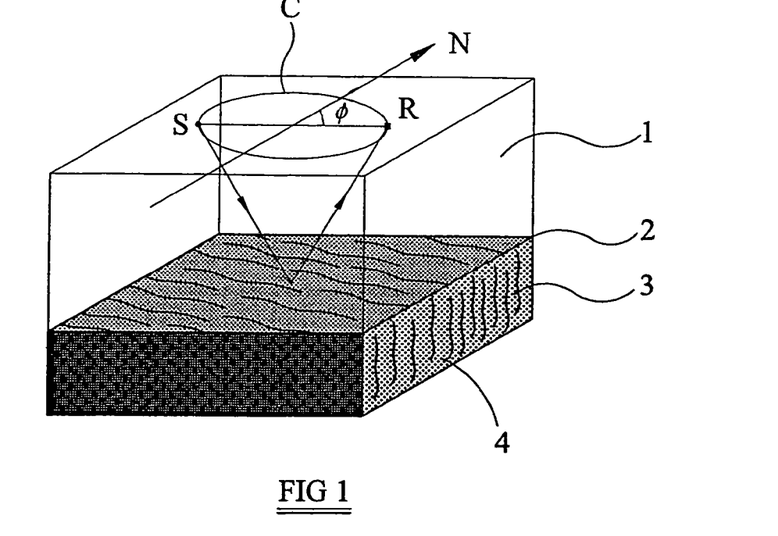
FIG. 1 is a schematic view of a seismic surveying arrangement in which the acquired data may exhibit azimuthal anisotropy.
Figures 2A, 2B, 2C:
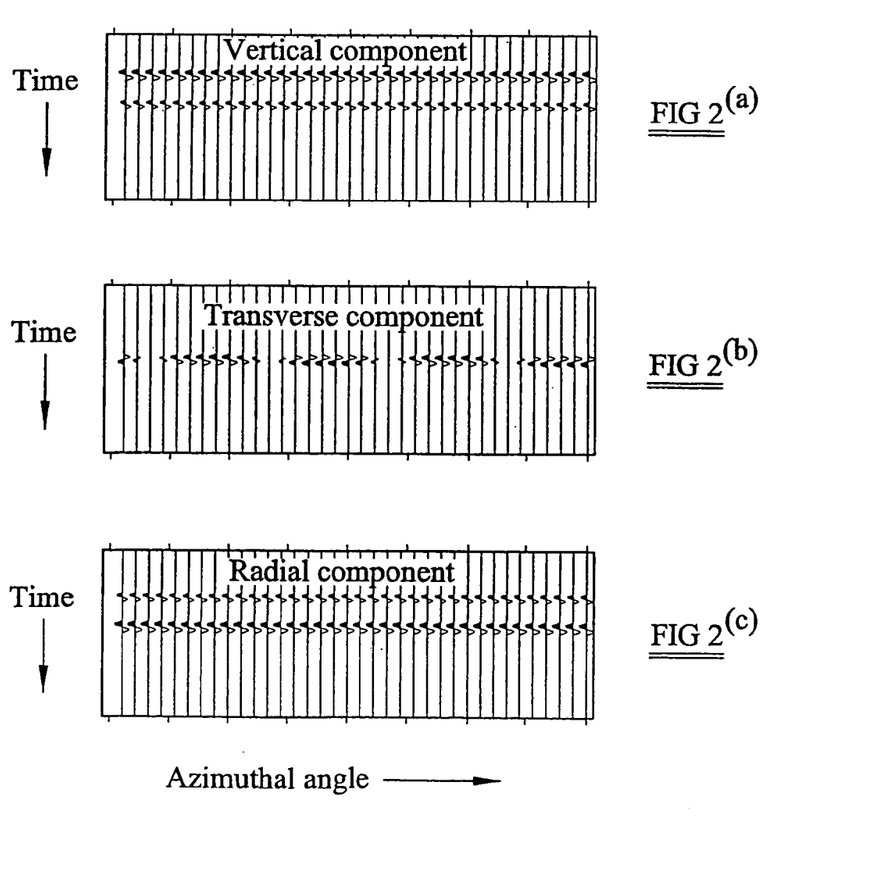
FIG. 2(a) shows the vertical component of the seismic energy acquired at the receiver in the seismic surveying arrangement of FIG. 1.
FIG. 2(b) shows the transverse component of the seismic energy acquired at the receiver in the seismic surveying arrangement of FIG. 1.
FIG. 2(c) shows the radial component of the seismic energy acquired at the receiver in the seismic surveying arrangement of FIG. 1.

FIGS. 1 and 2 illustrate the occurrence of azimuthal anisotropy in seismic data, one type of geophysical data. FIG. 1 illustrates a seismic surveying arrangement in which seismic energy emitted by a seismic source S is received at a seismic receiver R, for example a geophone. The seismic source S and the seismic receiver R are constrained to lie diametrically opposite one another on the circumference of a circle C. The angle $\phi$ is the angle between the source-receiver direction (on the earth's surface) and a predetermined direction (north in FIG. 1), and is known as the "azimuthal angle" or just "azimuth".

In this survey, seismic data are obtained for an initial value $\phi_0$ of the azimuth. The source S and the receiver R are then moved around the circle C, while still be being kept diametrically opposite, so that the azimuth is changed to a new value, $\phi_1$. Further seismic data are then acquired at the new azimuth $\phi_1$. This process may be repeated, and seismic data acquired at further azimuths $\phi_2$, $\phi_3$ etc.

If the elastic properties of the earth's interior were isotropic and laterally homogenous, the seismic data acquired by the seismic surveying arrangement of FIG. 1 should be independent of the azimuth $\phi$. It is commonly found however, that the seismic data depend on the azimuth—that is, the seismic data are azimuthally anisotropic. This indicates that the elastic properties of the earth's interior are not isotropic and/or are not laterally homogenous. Azimuthal anisotropy of the earth's interior may arise, for example, as a result of vertically aligned fractures within the earth.

In FIG. 1 the earth's interior is schematically represented as an upper, isotropic layer 1 and a lower, azimuthally anisotropic layer 3, separated by a horizontal interface 2. The lower layer 3 is azimuthally anisotropic owing to the presence of vertically-aligned fractures 4.

FIGS. 2(a) to 2(c) show a schematic representation of seismic data acquired by the seismic surveying arrangement of FIG. 1. FIG. 2(a) shows the vertical component of the seismic energy acquired at the receiver R, FIG. 2(b) shows the transverse component of the seismic energy acquired at the receiver R, and FIG. 2(c) shows the radial component of the seismic energy acquired at the receiver R. (The radial component of seismic energy acquired at the receiver R in FIG. 1 is the horizontal component in the source-receiver direction. The transverse component of seismic energy is perpendicular to the radial component and lies in the horizontal plane.)

Each of FIGS. 2(a) to 2(c) shows a set of seismic energy traces acquired at different source-receiver azimuths. Each set contains 36 traces, and the azimuth at which one trace in a set is acquired is 10° greater than the azimuth at which the previous trace in that set was acquired. Each trace was acquired by actuating the source S to emit a single pulse of seismic energy, and each trace shows the amplitude of the respective component of the seismic energy received at the receiver R as a function of time after the source S was actuated. The first event in the traces of FIGS. 2(a) and 2(c) corresponds to the Pp-wave reflection and the second event corresponds to interfering arrivals of the Ps1- and Ps2-wave reflections. The traces in FIG. 2(b) show only an event corresponding to interfering arrivals of the Ps1- and Ps2-wave reflections—the Pp reflection does not appear in the transverse component. The seismic data acquired by the receiver R would in practice contain a "direct event" corresponding to seismic energy that was transmitted from the source S direct to the receiver R through the upper layer 1, but this has been omitted from FIGS. 2(a) to 2(c) for clarity.

It will be noted from FIG. 2(b) that the transverse component of the seismic data exhibits azimuthal anisotropy. Azimuthal variations are clearly evident in both the magnitude and the polarity of the event in the transverse component. The vertical and radial components of the seismic data are, however, substantially independent of azimuth.

In general, the following attributes of acquired seismic data can show dependence on azimuth.

1) Arrival time. If the path of seismic energy from the source S to the receiver R passes through an azimuthally anisotropic medium then the propagation velocity within that medium will be azimuth-dependent. This leads to azimuth-dependent arrival times.

SUMMARY OF THE INVENTION

2) Polarisation angle. In the case of the anisotropic layer 3 of FIG. 1 having vertically aligned fractures, symmetry planes will exist in the directions normal to the fracture and parallel to the fracture (the "fracture strike" direction). For events derived from seismic energy propagating parallel to one of these symmetry planes, the polarisation of the events must be aligned either parallel or perpendicular to this plane. For seismic energy propagating in other directions, however, the polarisation is not similarly constrained. Thus, the deviation of the Ps-wave polarisation from the source-receiver azimuth would be zero in the fracture normal and fracture strike directions but would generally be non-zero for other azimuths.

3) Transverse energy. The magnitude of the transverse component of seismic energy recorded at the receiver R in the seismic surveying arrangement of FIG. 1 is related to the symmetry planes. For events derived from seismic energy propagating parallel to one of the symmetry planes no energy will be observed in the transverse energy component, whereas events derived from seismic energy propagating in other directions will have a non-zero transverse component. Moreover, in some survey geometries transmitted P-wave arrivals can be examined in a similar way—for example if direct transmitted arrivals are being recorded in a Vertical Seismic Profile (VSP) survey, then the P-wave arrivals can also have a transverse component.

4) Polarity—the polarity on the transverse component of the Ps events will reverse as the source-receiver azimuth passes through the fracture normal and fracture strike directions. If transmitted arrivals are being recorded, for example in a VSP survey, then polarity changes may also be observed in the P-wave arrivals, as reported by G. Rossi, A. Vesnaver and S. A. Petersen in "Anisotropy Detection in a 3D three-component VSP", First Break Vol. 19, No. 4, pp 191-200 (2001).

5) Temporal frequency. Azimuthal anisotropy can lead to two S-events being excited, and these are known as the Ps1 and Ps2 events. Where the time delay between the arrivals at the receiver of these two s-events is insufficient to separate the S-waves into two distinct arrivals, interference between the two shear wave arrivals may occur. Depending on whether it is constructive or destructive, this interference will lead to either an increase or a decrease in the temporal frequency. Since the shear-wave splitting is azimuthally dependent then it follows that the temporal frequency is also azimuthally dependent. Azimuthal variations will also be apparent in temporal frequency because of azimuth-dependent attenuation.

5) Amplitude. The amplitude of seismic energy recorded at the receiver will vary as a function of azimuth because of azimuthally anisotropic attenuation and wavefront divergence.

6) Linearity. For the Ps events, maximum linearity is observed for events derived from seismic energy propagating parallel to one of the symmetry planes because only one s-wave will be excited. The linearity will be lower for events derived from seismic energy propagating in directions other than the symmetry planes.

As noted above, azimuthal anisotropy is often attributed to the presence of vertically aligned fractures in the earth. Thus, characterising azimuthal anisotropy in seismic data or other geophysical data can provide a better understanding of the presence of fractures within the earth, and this can lead to improved productivity from hydrocarbon and geothermal reservoirs.

A further cause of azimuthal anisotropy in geophysical data is that many geological reflectors within the earth are not horizontal but are dipped. Where geophysical data is acquired from a dipped reflector, some attributes of the data will show azimuth-dependent variations. These azimuth-dependent variations will possess mirror symmetry planes aligned with the reflector dip and the reflector strike. Thus, determination of the mirror symmetry planes in the geophysical data identifies the direction in which the dipped reflector is oriented.

Previously, azimuthal anisotropy in geophysical data has been investigated by analysing shear-wave splitting or fitting elliptical variations to normal moveout (NMO) velocities or AVO as a function of azimuth.

Ellipse fitting has previously been applied to the analysis of azimuthal variations in seismic data attributes, as reported in U.S. Pat. No. 5,508,973 and by V. Grechka and I. Tsvankin in "3D description of normal moveout in anisotropic media", SEG Expanded abstracts pp 1487-1490 (1996). R. Bale et al. have proposed, in "Analysis and stacking of 3D converted wave data in the presence of azimuthal anisotropy", SEG Expanded Abstracts pp 1189-1192 (2000), a method of identifying polarity changes which are expected to occur every 90 degrees of azimuth on the transverse component for Ps waves. This technique applies a numerical search using a polarity filter to find an azimuthal angle where the polarity reversals occur. Garotta and Granger have proposed, in "Acquisition and processing of 3C×3D data using converted 3C×3D data using converted waves", SEG, pp 995-997 (1988), a similar method that uses measurements of the ratio of transverse to radial components to identify 'dimming' directions. These dimming directions are associated with the fracture normal and fracture strike azimuths that occur every 90 degrees. The theoretical basis for these prior art ellipse fitting methods assumes that higher-order terms can be neglected. In real geophysical data, however, higher-order terms may be significant.

A first aspect of the present invention provides a method of processing geophysical data, the data comprising at least a first set of geophysical data acquired with a first source-receiver azimuth and a second set of geophysical data acquired with a second source-receiver azimuth different from the first source-receiver azimuth, the method comprising; (a) selecting an attribute of the geophysical data that is dependent on the source-receiver azimuth; and (b) determining a value of the source-receiver azimuth about which the selected attribute exhibits mirror symmetry. This provides an improved method of determining the azimuths of the mirror symmetry planes within the earth.

The method may be carried out on pre-existing geophysical data. Alternatively, the method may comprise an initial step of acquiring at least a first set of geophysical data with a first source-receiver azimuth and a geophysical set of seismic data with a second source-receiver azimuth different from the first source-receiver azimuth.

A second aspect of the invention provides a method of determining an azimuthal symmetry plane within the earth from geophysical data comprising at least a first set of geophysical data acquired with a first source-receiver azimuth and a second set of geophysical data acquired with a second source-receiver azimuth different from the first source-receiver azimuth, the method comprising the steps of: a) selecting an attribute of the geophysical data that is dependent on the source-receiver azimuth; and determining a value of the source-receiver azimuth about which the selected attribute exhibits mirror symmetry thereby to locate a mirror symmetry plane within the earth.

The geophysical data may be seismic data.

A third aspect of the invention provides an apparatus for processing geophysical data comprising at least a first set of geophysical data acquired with a first source-receiver azimuth and a second set of geophysical data acquired with a second source-receiver azimuth different from the first source-receiver azimuth, the apparatus comprising; means for selecting an attribute of the geophysical data that is dependent on the source-receiver azimuth; and means for determining a value of the source-receiver azimuth about which the selected attribute exhibits mirror symmetry.

A fourth aspect of the invention provides an apparatus for determining an azimuthal symmetry plane within the earth from geophysical data comprising at least a first set of geophysical data acquired with a first source-receiver azimuth and a second set of geophysical data acquired with a second source-receiver azimuth different from the first source-receiver azimuth, the apparatus comprising: a) means for selecting an attribute of the geophysical data that is dependent on the source-receiver azimuth; and b) means for determining a value of the source-receiver azimuth about which the selected attribute exhibits mirror symmetry thereby to locate a mirror symmetry plane within the earth.

In a preferred embodiment the apparatus comprises a programmable data processor.

The present invention also provides a storage medium comprising a program for a data processor of an apparatus as defined above.

BRIEF DESCRIPTION OF THE DRAWINGS

Preferred embodiments of the present invention will now be described by way of illustrative example, with reference to the accompanying Figures in which.

DETAILED DESCRIPTION OF THE INVENTION

Figure 5:
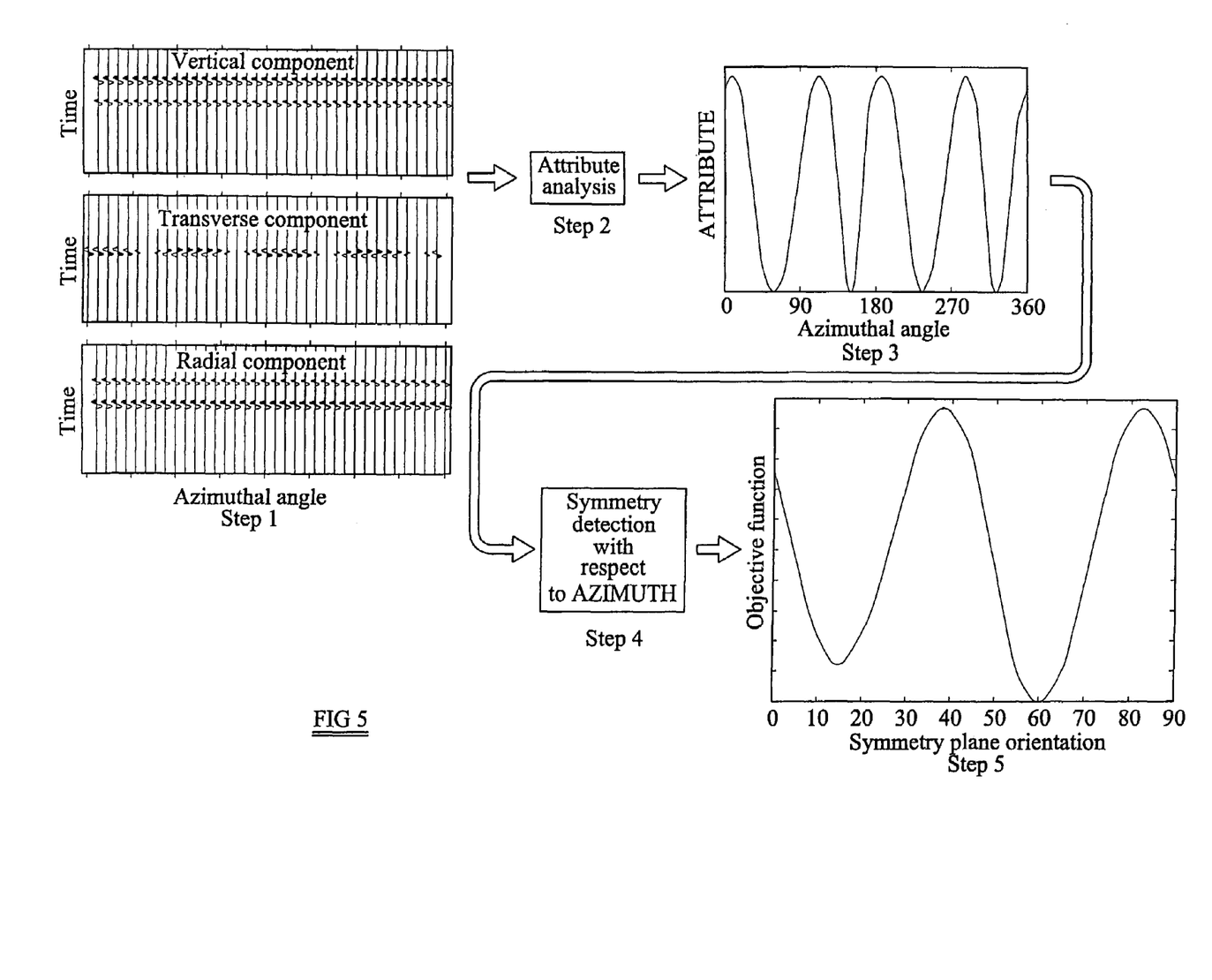
FIG. 5 is a schematic illustration of the principal steps of a method according to the present invention.

The principal steps of a method according to an embodiment of the present invention are schematically illustrated in FIG. 5. In this embodiment the geophysical data are seismic data.

Initially, at step 1, seismic data are acquired. The seismic data contains sets of data acquired at different source-receiver azimuths. The seismic data acquired in step 1 is shown in FIG. 5 as comprising a set of seismic data for every 10° increment in the source-receiver azimuth, but the sets of seismic data could be acquired using smaller or greater increments in the source-receiver azimuths. In the absence of any a prior knowledge about the azimuthal orientation of symmetry planes within the earth, the geophysical data preferably contains dense azimuthal sampling over the full 360° azimuth range. However, if there is pre-existing information about the orientation of symmetry planes it may be sufficient to acquire data having a smaller azimuth range that includes the expected azimuth of a symmetry plane.

It should be noted that the invention can alternatively be applied to pre-existing seismic data having a suitable azimuth coverage. In this case, the step of acquiring seismic data is not required.

Next, at step 2, the seismic data is processed to determine one or more attributes of the data that are dependent on the source-receiver azimuth. One attribute that is found to be azimuth-dependent is selected, and the value of this attribute determined for all available azimuthal angles—i.e., the value of this attribute in each seismic data set is determined. The attribute can be any attribute of the seismic data that is dependent on the source-receiver azimuth, and could be, for example, one of the attributes (1) to (7) listed above.

In general the acquired seismic data will contain data only for certain azimuths, for example for 10° increments of azimuth in the case of the data of FIGS. 2(a) to 2(c). Thus, analysis of the seismic data will produce a set of discrete values of the selected attribute.

The results of processing the seismic data at step 2 are stored, and are then output as step 3. The results may be, for example, output on a suitable display for inspection by an operator. It will be noted in FIG. 5 that the value of the selected attribute has been interpolated between the discrete values derived from the seismic data to generate a continuous trace for the attribute over the 0° to 360° azimuth range, but this does not need to be done.

In principle, the processing step described below could be carried out on the stored data without displaying the stored data. Step 3 may therefore be omitted if desired.

At step 4, the azimuth-dependence of the selected attribute is processed to determine one or more azimuthal angles about which the attribute is mirror-symmetric. The or each such azimuthal angle corresponds to a plane of symmetry within the earth's interior.

As noted above, aligned vertical fractures within the earth's interior are one cause of symmetry planes within the earth. A vertical fracture causes two symmetry planes. One symmetry plane is in the fracture strike direction, and the other is perpendicular to the plane of the fracture—so that the two symmetry planes are perpendicular to one another. Vertical fractures within the earth are typically caused by stresses which are approximately constant over a large area. As a result, in a set of fractures within the earth the fractures will generally have similar orientations to one another, so that the symmetry planes of different fractures will also be similar to one another.

The processing of the azimuth-dependence of the attribute at step 4 can be performed using any suitable mirror symmetry-detection technique. There are many known methods for mirror symmetry detection, and mirror symmetry detection is a well-established technique in other disciplines such as, for example, structural chemistry or image processing.

Finally, at step 5, the results of step 4 are output. In FIG. 5 the results are shown as being output as a visual trace, but the results can be output in any convenient form. Alternatively, the results may be stored for use in further processing of the seismic data, in which case step 5 may be omitted.

FIG. 5 illustrates the results of a preferred method of determining azimuthal angles at which the azimuth-dependence of the attribute exhibits mirror symmetry. This method is to generate a function indicative of the variation between the value of the selected attribute at a first source-receiver azimuth and the value of the selected attribute at a second source-receiver azimuth obtained by reflecting the first source-receiver azimuth about a trial azimuth of a mirror symmetry plane. The values of the attribute at these two azimuths are combined into a function known as an "objective function". The absolute value of the objective function will be at a minimum, possibly zero, if the trial azimuth of the mirror symmetry plane is correct. Thus, the true azimuth of the mirror symmetry plane can be found by finding a value of the trial azimuth of the mirror symmetry plane that minimises the absolute value of the objective function. This can be done, for example, by finding a value of the trial azimuth of the mirror symmetry plane that makes the absolute value of the objective function zero. Alternatively, it may be done by finding a value of the trial azimuth of the mirror symmetry plane that makes the absolute value of the objective function less than a pre-set threshold. In this embodiment, the data output at step 5 of FIG. 5 could be the value of the objective function over a pre-selected azimuth range (as shown in FIG. 5), or alternatively or additionally they could be an azimuth of the mirror symmetry plane that minimises the absolute value of the objective function.

The objective function output at step 5 of FIG. 5 has a value of zero at φ=60°. As will be explained below, this indicates that the azimuth of one symmetry plane is 60°. Moreover, since the two symmetry planes are orthogonal to one another, it follows that the azimuth of the second symmetry plane is 150°. (The minimum at φ=15° in the objective function arises owing to noise in the seismic data and does not represent a symmetry plane.)

Determination of the symmetry planes provides information about the orientation of fractures within the earth, if these are responsible for the azimuthal anisotropy. Alternatively if the azimuthal anisotropy is a consequence of reflector dip, then the determination of the symmetry planes provides information about the reflector dip and reflector strike, and this information can be used to correct for the reflector dip during further processing of the seismic data.

A preferred method of determining the azimuthal angles at which the azimuth-dependence of the selected attribute of the seismic data exhibits mirror symmetry will now be described. This method will be described using the transverse component of the energy acquired at the receiver as the azimuth-dependent attribute, but the method is not limited to this attribute.

Figure 3A:
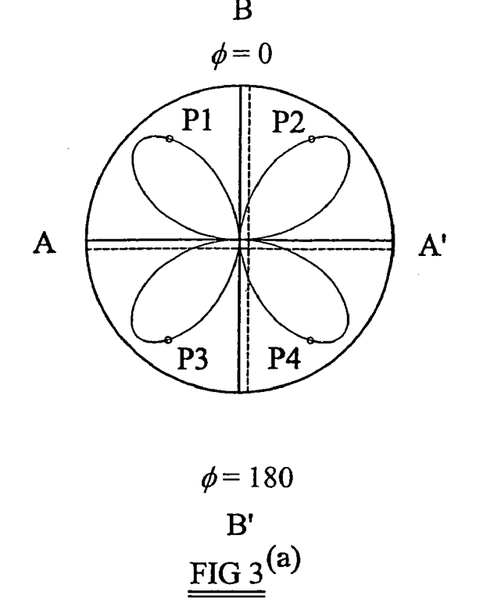
FIG. 3(a) illustrates the azimuthal dependence of a seismic attribute acquired at the receiver in the seismic surveying arrangement of FIG. 1.

FIG. 3(a) shows a typical result for the magnitude of the transverse component of the received energy, plotted against the source-receiver azimuth φ. The magnitude is plotted as a polar plot, and the radius at a given azimuth denotes the magnitude of the transverse component of the energy at that azimuth. The transverse component of the received energy displays minima at φ=0°, 90°, 180° and 270°, and displays a maximum between each two adjacent minima. The magnitude of the transverse component of the energy plotted in FIG. 3 has the same value at the points 1, 2, 3 and 4, so that the radius of the attribute variation curve is equal at the azimuths corresponding to these points. The transverse energy attribute in azimuthally anisotropic seismic data will generally demonstrate behaviour similar to that shown in FIG. 3(a).

Figure 3B:
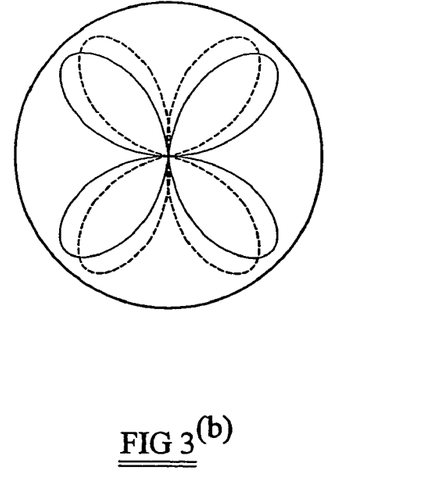
FIG. 3(b) illustrates the effect of a rotation of 90° on the seismic energy pattern of FIG. 3(a)

FIG. 3(b) shows, in dotted lines, the result of rotating the plot of FIG. 3(a) by 90°. This is overlaid on the original plot (shown in full lines) for ease of comparison. It can clearly be seen that the transverse component of the received energy shown in FIG. 3(a) does not have 4-fold rotational symmetry, since rotating the plot by 90° does not transform it back onto itself. Rather, the transverse component of the received energy shown in FIG. 3(a) has two mirror planes of symmetry, and these are aligned along A-A' and B-B'. The mirror planes of symmetry are orthogonal to one another.

In the case of an attributed f that exhibits azimuthal anisotropy, the existence of two orthogonal mirror symmetry planes requires that the following equation holds:

$$f(\phi-\phi_0)=f(-\phi+\phi_0)=f(180-\phi+\phi_0)=f(180+\phi-\phi_0) \quad (1)$$

where f(φ) is the value of the attribute at an azimuth φ, and one symmetry plane lies at an azimuth $\phi_0$. It can be seen that this equation is satisfied for the results of FIG. 3(a). For example, the mirror symmetry plane B-B' has an azimuth $\phi_0$=0°, in which case equation (1) requires that f(φ)=f(-φ)=f(180+φ)=f(180-φ)—and this is true for the results of FIG. 3a.

Where the value of $\phi_0$ is unknown, its value may be found by determining the value of $\phi_0$ that minimises an objective function such as the following:

$$E = \sum_{i=1}^{n} (f_i - f[-\phi + \phi_0])^2 + \quad (2)$$
$$(f_i - f[180 - \phi + \phi_0])^2 + (f_i - f[180 + \phi - \phi_0])^2$$

In equation (2), $f_i$ is the $i^{th}$ value of the selected attribute, which lies at an azimuth angle φ, and f[α] is the value of the attribute at the azimuth α. The objective function E will have minimum at values of $\phi_0$ that are the azimuth of a mirror symmetry plane. The objective function will have a minimum at the azimuth of each symmetry plane, and so will have minima at four azimuths in the 0 to 360° azimuth range in the case of two orthogonal mirror symmetry planes.

It will be noted that the objective function of equation (2) cannot be negative. This feature is preferred, since it simplifies use of an iterative technique to determine the value of $\phi_0$ that minimises the objective function.

Figure 4A:
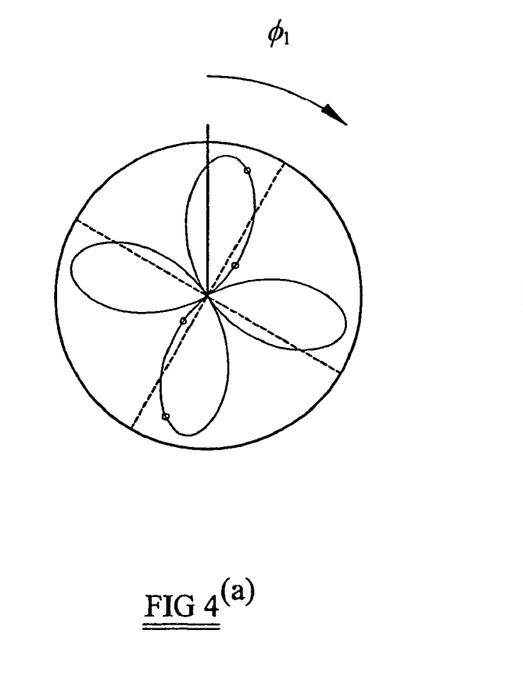
FIGS. 4(a) and 4(b) are schematic illustrations of the principle of a method according to the present invention.
Figure 4B:
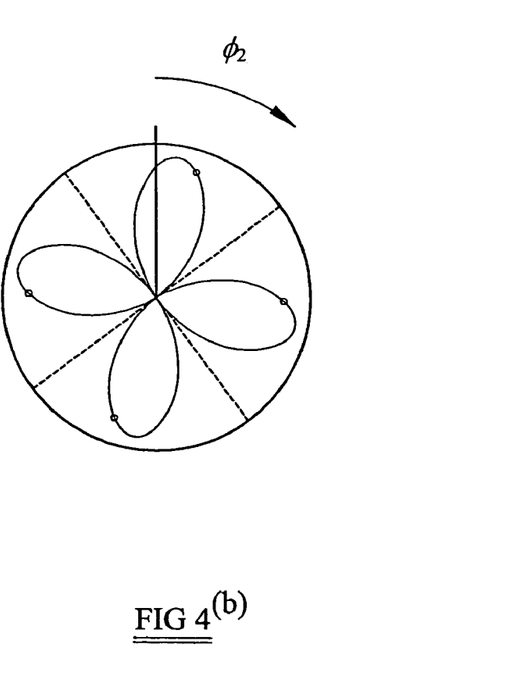

FIGS. 4(a) and 4(b) are a schematic illustration of the operation of this method. In FIG. 4(a), the azimuth $\phi_1$ has been chosen as the first estimate of the azimuth of a mirror symmetry plane. This corresponds to the orientation of the mirror symmetry planes shown by broken lines. The open circle denotes the point $f_i$ which is the value of the attribute at an azimuth angle $\phi_i$.

The value of the objective function E for the trial estimate $\phi_1$ of the azimuth of a mirror symmetry plane is found by computing the value of the attributed f at the three azimuths derived from the trial estimate $\phi_1$ of the azimuth of the mirror symmetry plane and the azimuth $\phi_i$ of the point $f_i$. The three azimuths give the three points shown as crossed circles in FIG. 4(a). The objective function E is then calculated from $f_i$ and from the value of the attribute at the three points shown as crossed circles.

It should be noted that in a practical case in which seismic data was acquired for increments of, say, 10° or 15°, then for an arbitrary initial values of $\phi_1$ and $\phi_i$, it may well be found that the acquired seismic data does not contain a data set for one or more of the azimuths ($-\phi_1+\phi_i$), ($180-\phi_1+\phi_i$) and ($180+\phi_1-\phi_i$). In this case it is necessary to obtain the values of the attribute at one or more of these azimuths by interpolation.

In principle it is possible to interpolate the values of the attribute derived from the seismic data at step 2 of FIG. 5 to generate a continuous or quasi-continuous set of values for the attribute, so that the output at step 3 is a continuous or quasi-continuous set of values for the attribute. In practice, however, it may be more efficient to perform the interpolation only as and when required during the calculation of the objective function so as to reduce the computing power required.

As shown by equation (1), the value of the attribute at the azimuth denoted by the open circle ($f_i$) and the value of the attribute at each of the three azimuths denoted by the crossed circles should be equal, if the trial estimate, $\phi_1$, of the azimuth of a mirror symmetry plane is correct. This would lead to a value of zero for the objective function E. This is clearly not the case in FIG. 4(a), however, and this indicates that the trial estimate $\phi_1$ of the azimuth of a mirror symmetry plane is not correct. The value of the objective function E for the case of FIG. 4(a) will not be a minimum.

FIG. 4(b) corresponds to FIG. 4(a), but is for a different trial estimate, $\phi_2$, of the azimuth of a mirror symmetry plane. The estimate $\phi_2$ is much closer to the correct azimuth, and it is clear that the value of the attribute at the azimuth denoted by the open circles and the value of the attribute at each of the azimuths denoted by the crossed circles will be approximately equal to one another, so that the value of the objective function E will be close to a minimum.

One way of determining the azimuth of the mirror symmetry planes is to calculate the value of the objective function for the trial estimate $\phi_1$ of the azimuth of a mirror symmetry plane. It would then be tested whether the value of the objective function for $\phi_1$ was zero, or acceptably close to zero; if it was, this would indicate that the azimuth of a mirror symmetry plane was, or was very close to, $\phi_1$. If, however, the value of the objective function for $\phi_1$ was not zero or acceptably close to zero, then any suitable optimisation technique can be used to determine the azimuth of a mirror symmetry plane that minimises the objective function.

It should be noted that it is not necessary to investigate the objective function over the full 360° azimuth range. In the case of two orthogonal planes of mirror symmetry, any azimuth range of 90° should contain an azimuth value that minimises the objective function $\chi^2$. In principle, therefore, investigating the objective function over an azimuth range of at least 90° should identify a mirror symmetry plane. Investigating the objective function over an azimuth range of less than 90° is not certain to identify a mirror symmetry plane, although it could do. However, if there exists a priori information about the likely orientation of a mirror symmetry planes it would be possible to investigate the objective function over a small azimuth range around the trial estimated azimuth of a mirror symmetry plane. Such a priori information about the azimuth of a mirror symmetry plane might be derived, for example, from knowledge of the regional stress regime in a case where the azimuthal anisotropy results from the presence of fractures within the earth.

The seismic data will have been acquired with a particular direction, for example north, defined as the azimuth zero. Once the azimuths of the mirror symmetry planes have been detected, it is possible to rotate the seismic data so that the azimuth zero is coincident with a mirror symmetry plane. This facilities subsequent processing of the seismic data, so allowing an improvement in the seismic image derived from the seismic data.

Rotating the seismic data also allows extraction of further seismic attributes to characterise the seismic anisotropy. This may be done by a three-stage process in which initially a determination of the orientation of the symmetry planes is made using one azimuthally-dependent attribute of the seismic data. The data is then rotated so that the azimuth zero is coincident with a mirror symmetry plane. Finally, other attributes are extracted from the rotated seismic data.

The invention has so far been described for data acquired using a surface seismic surveying arrangement of the type shown in FIG. 1, in which the seismic source S and the receiver R are both disposed on the earth's surface. The invention is not limited to processing seismic data obtained by a surface seismic surveying arrangement, however, and can be applied to all seismic data that show azimuthal anisotropy, regardless of how the data were obtained. For example, seismic data obtained using a VSP seismic surveying arrangement, in which the receiver R is disposed within a borehole, may be processed by a method of the invention, provided that the azimuth coverage of the acquired seismic data is sufficient.

Figure 6A:
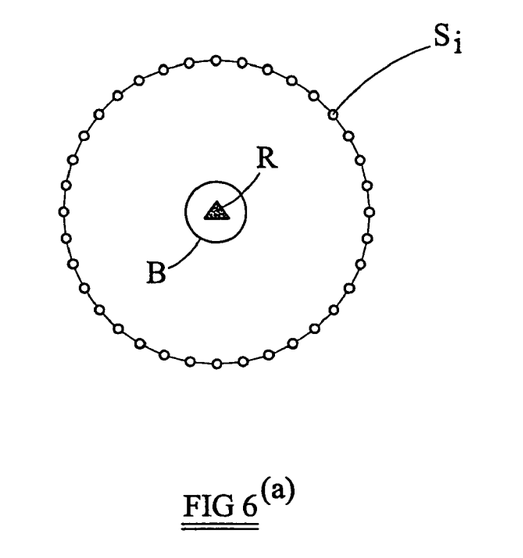
FIG. 6(a) is a schematic plan view of a seismic surveying arrangement suitable for use with the present invention.

FIG. 6(a) is a schematic plan view of a VSP surveying arrangement suitable for acquiring seismic data for processing by a method of the invention. A receiver R is disposed within a borehole B, and a plurality of source positions $S_i$ are defined around the receiver R on a circle centred on the borehole. In FIG. 6(a), a source position $S_i$ is defined every 10° of azimuth, but the azimuthal interval between adjacent source positions could be greater or less than 10°.

In principle a separate seismic source could be located at each source location $S_i$. It is, generally more efficient, however, to use a "walkaround" technique in which a seismic source is disposed at one of the source locations $S_i$ and is actuated, and seismic data are acquired for that particular source-receiver azimuth. The source is then moved to another of the source locations $S_i$ and data are acquired at the new source-receiver azimuth. The process of moving the seismic source and acquiring data at the new source-receiver azimuth is repeated until data have been acquired for all desired values of the source-receiver azimuth.

The invention can also be applied to reverse VSP seismic data, which is acquired using a seismic source disposed within a borehole and a receiver located on the earth's surface. Reverse VSP data suitable for processing by the method of the invention could be obtained using a seismic surveying arrangement corresponding to that of FIG. 6(a), but with the source and receiver positions exchanged. That is to say, a seismic source S would be disposed within the borehole B, and a plurality of receiver positions $R_i$ are defined around the source S on a circle centred on the borehole.

Figure 6B:
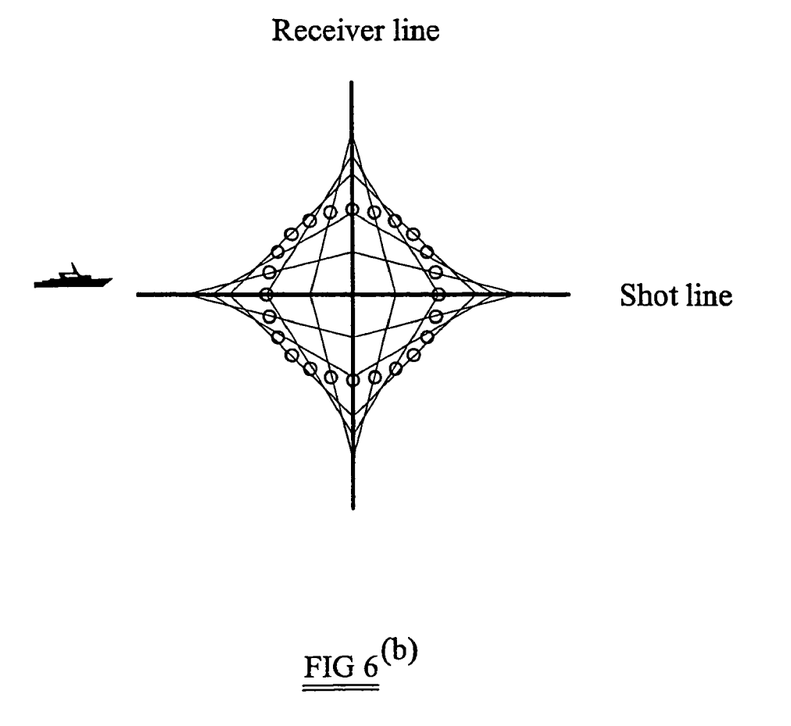
FIG. 6(b) is a schematic plan view of another seismic surveying arrangement suitable for use with the present invention.

FIG. 6(b) illustrates another seismic surveying arrangement suitable for acquiring data for a number of source receiver azimuths. This is an Ocean Bottom Cable seismic surveying arrangement, in which a seismic source array is moved through the water by a towing vessel. Seismic energy emitted by the seismic source array is detected by a static array of receivers disposed on the sea-bed. In the example shown in FIG. 6(b) the array of seismic sources is a linear array, and the receivers are also arranged in a linear array. The source line is perpendicular to the receiver line, and this produces the common offset ring gather illustrated in FIG. 6(b). The positions in FIG. 6(b) where a thin line intersects the shot line or the receiver line indicate a source position or a receiver position respectively.

In the example described above, the azimuth-dependence was determined for only one attribute of the seismic data. In general, however, seismic data acquired in a seismic survey may well contain more than one attribute that is azimuth-dependent. In this case two or more determinations of the orientation of the mirror symmetry planes may be made, each determination being made using a different attribute of the seismic data. The results of the separate determinations can be combined, for example using an averaging process, to obtain a final estimate of the azimuth of the mirror symmetry planes.

Alternatively, two or more azimuth-dependent attributes may be combined, and the orientation of the symmetry planes may be determined from the combined attribute.

The preferred embodiments described above relate to a case in which two orthogonal; symmetry planes exist within the earth. The invention is not limited to this case, however, and may be applied to the case where only a single symmetry plane exists. The existence of a single mirror symmetry plane requires that:

$$f(\phi-\phi_0)=f(-\phi+\phi_0) \tag{3}$$

where f($\phi$) is the value of the attribute at an azimuth $\phi$, and the symmetry plane lies at an azimuth $\phi_0$. In place of the objective function E given above in equation (2), a suitable objective function for the case of a single mirror symmetry plane is given by:

$$E' = \sum_{i=1}^{n}(f_i - f[-\phi + \phi_0])^2 \quad (4)$$

The objective functions E and E' given in Equations (2) and (4) above measure the square of the difference between the actual value of an attribute and the value predicted for that attribute using a trial estimate of the azimuth of a symmetry plane. Thus, the process of determining the azimuth of a symmetry plane that minimises the objective function E or E' is a "least squares" process. The invention is not limited to objective functions that measure the square of the difference between the actual value of an attribute and the value predicted for that attribute, however, and any objective function that provides a measure of the difference between the actual value of an attribute and the value predicted for that attribute can be used.

As an example, an objective function that measures the absolute difference between the actual value of an attribute and the value predicted for that attribute could be used in place of the objective functions E or E'. Finding the azimuth of the symmetry plane that produces the "least absolute value" of the difference can be more reliable than a "least squares" process, particularly if the data contain noise.

Thus, in the case of two orthogonal symmetry planes, a suitable "least absolute value" objective function would be:

$$E'' = \sum_{i=1}^{n}|f_i - f[-\phi + \phi_0| + \quad (5)$$
$$|f_i - f[180 - \phi + \phi_0]| + |f_i - f[180 + \phi - \phi_0]|$$

In principle, any objective function of the following general form could be used:

$$E_N = \Sigma|\text{actual attribute} - \text{estimated attribute}|^N \quad (6)$$

where N is a positive number.

The invention has been described above with particular reference to seismic data. The invention is not, however, limited to seismic data but may be applied to any geophysical data that exhibits azimuthal asymmetry. For example, it could also be applied to borehole imaging logs constructed from, for example, acoustic and/or resistivity data.

Figure 7:
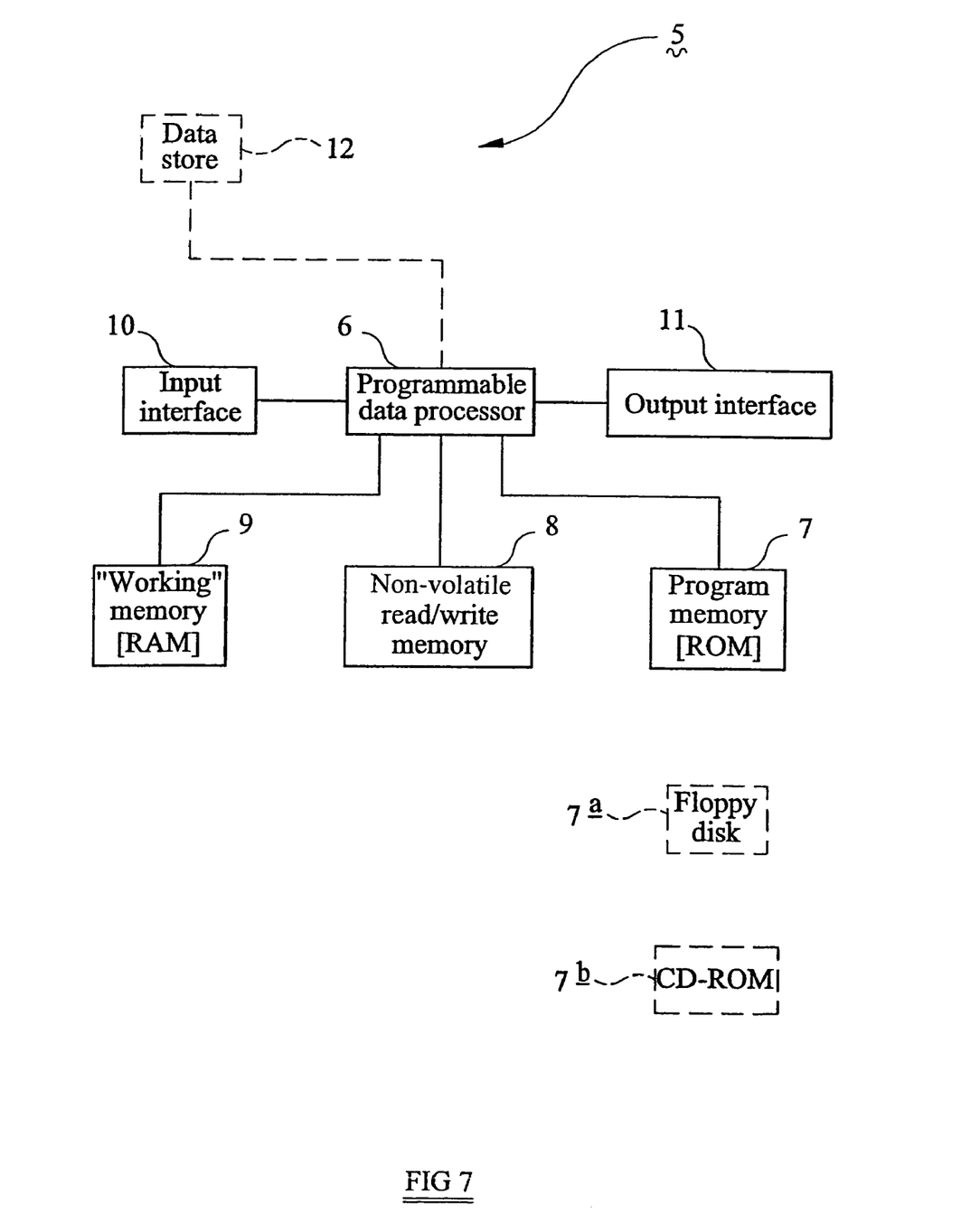
FIG. 7 is a block schematic diagram of an apparatus according to the present invention.

FIG. 8 is a schematic block diagram of an apparatus 5 that is able to perform a method according to the present invention.

The apparatus 5 comprises a programmable data processor 6 with a program memory 7, for instance in the form of a read only memory (ROM), storing a program for controlling the data processor 6 to process seismic data by a method of the invention. The apparatus further comprises non-volatile read/write memory 8 for storing, for example, any data which must be retained in the absence of a power supply. A "working" or "scratch pad" memory for the data processor is provided by a random access memory RAM 9. An input device 10 is provided, for instance for receiving user commands and data. One or more output devices 11 are provided, for instance, for displaying information relating to the progress and result of the processing. The output device(s) may be, for example, a printer, a visual display unit, or an output memory.

Sets of seismic data for processing may be supplied via the input device 10 or may optionally be provided by a machine-readable data store 12.

The results of the processing may be output via the output device 17 or may be stored.

The program for operating the system and for performing the method described hereinbefore is stored in the program memory 7, which may be embodied as a semiconductor memory, for instance of the well known ROM type. However, the program may well be stored in any other suitable storage medium, such as a magnetic data carrier 7a (such as a "floppy disk") or a CD-ROM 7b.

The invention claimed is:

1. A method of processing geophysical data, the data comprising at least a first set of geophysical data acquired with a first source-receiver azimuth and a second set of geophysical data acquired with a second source-receiver azimuth different from the first source-receiver azimuth, the method comprising:
    a) selecting an attribute of the geophysical data that is dependent on the source-receiver azimuth;
    b) determining a value of the source-receiver azimuth about which the selected attribute exhibits mirror symmetry using a function indicative of a correspondence between a selected source-receiver azimuth and the value of the source-receiver azimuth about which the selected attribute exhibits mirror symmetry, wherein the function is expressed as:

$$E = \sum_{i=1}^{n}(f_i - f[-\phi + \phi_0])^2 +$$
$$(f_i - f[180 - \phi + \phi_0])^2 + (f_i - f[180 + \phi - \phi_0])^2$$

where $f_i$ is the value of the selected attribute at a source-receiver azimuth $\phi$, and $f[\alpha]$ is the value of the attribute at a source-receiver azimuth $\alpha$, $\phi_0$ is the value of the source-receiver azimuth about which the selected attribute exhibits mirror symmetry; and
    c) storing the value of the source-receiver azimuth about which the selected attribute exhibits mirror symmetry to memory; and
    d) wherein the method is performed on a computer processor, to memory.

2. The method of claim 1, wherein step (b) comprises determining a respective value of the selected attribute from each set of geophysical data.

3. The method of claim 2, further comprising the step of interpolating between the value of the selected attribute determined from the first set of geophysical data and the value of the selected attribute determined from the second set of geophysical data thereby to estimate the value of the selected attribute at a source-receiver azimuth intermediate the first and second source-receiver azimuths.

4. The method of claim 1, wherein the determining step comprises
    d) calculating a function indicative of the variation between the value of the selected attribute at a first source-receiver azimuth ($\phi - \phi_0$) and the value of the selected attribute at a second source-receiver azimuth ($\phi_0 - \phi$) where $\phi_0$ is the azimuth of a mirror symmetry plane, and
    e) determining a value of $\phi_0$ that minimizes the value of the function indicative of the correspondence between the selected source-receiver azimuth and the value of the source-receiver azimuth about which the selected attribute exhibits mirror symmetry.

5. The method of claim 4 wherein step (e) comprises determining a value of $\phi_0$ that gives a value for the function indicative of the correspondence between the selected source-receiver azimuth and the value of the source-receiver azimuth about which the selected attribute exhibits mirror symmetry that is lower than a pre-set value.

6. The method of claim 1, further comprising:
   d) selecting another attribute of the geophysical data that is dependent on the source-receiver azimuth; and
   e) determining a value of the source-receiver azimuth about which the another selected attribute exhibits mirror symmetry.

7. The method of claim 6, further comprising the step of determining a value of the azimuth of a mirror symmetry plane within the earth from the value of the source-receiver azimuth about which the selected attribute exhibits mirror symmetry and from the value of the source-receiver azimuth about which the another selected attribute exhibits mirror symmetry.

8. The method of claim 1, wherein the attribute is selected from the arrival time, the polarisation angle, the transverse component, the polarity, the temporal frequency, the amplitude or the linearity of acquired seismic energy.

9. The method of claim 1, further comprising:
   locating a mirror symmetry plane within the earth from the determined value; and
   controlling subsequent processing steps on the basis of the located mirror symmetry plane.

10. The method of claim 1, further comprising an initial step of acquiring at least a first set of geophysical data with a first source-receiver azimuth and a second set of geophysical data with a second source-receiver azimuth different from the first source-receiver azimuth.

11. The method of claim 1, wherein the geophysical data are seismic data.

12. A method of determining an azimuthal symmetry plane within the earth from geophysical data comprising at least a first set of geophysical data acquired with a first source-receiver azimuth and a second set of geophysical data acquired with a second source-receiver azimuth different from the first source-receiver azimuth, the method comprising the steps of:
   a) selecting an attribute of the geophysical data that is dependent on the source-receiver azimuth;
   b) determining a value of the source-receiver azimuth about which the selected attribute exhibits mirror symmetry thereby to locate a mirror symmetry plane within the earth using a function indicative of a correspondence between a selected source-receiver azimuth and the value of the source-receiver azimuth about which the selected attribute exhibits mirror symmetry, wherein the function is expressed as:

$$E = \sum_{i=1}^{n} (f_i - f[-\phi + \phi_0])^2 + (f_i - f[180 - \phi + \phi_0])^2 + (f_i - f[180 + \phi - \phi_0])^2$$

where $f_i$ is the value of the selected attribute at a source-receiver azimuth $\phi$, and $f[\alpha]$ is the value of the attribute at a source-receiver azimuth $\alpha$, $\phi_0$ is the value of the source-receiver azimuth about which the selected attribute exhibits mirror symmetry; and c) storing the value of the source-receiver azimuth about which the selected attribute exhibits mirror symmetry to memory; and
   d) wherein the method is performed on a computer processor, to memory.

13. The method of claim 12, wherein step (b) comprises determining a respective value of the selected attribute from each set of geophysical data.

14. The method of claim 13, further comprising the step of interpolating between the value of the selected attribute determined from the first set of geophysical data and the value of the selected attribute determined from the second set of geophysical data thereby to estimate the value of the selected attribute at a source-receiver azimuth intermediate the first and second source-receiver azimuths.

15. The method of claim 12, wherein the determining step comprises
   d) calculating a function indicative of the variation between the value of the selected attribute at a first source-receiver azimuth ($\phi-\phi_0$) and the value of the selected attribute at a second source-receiver azimuth ($\phi_0-\phi$) where $\phi_0$ is the azimuth of a mirror symmetry plane, and
   e) determining a value of $\phi_0$ that minimizes the value of the function indicative of the correspondence between the selected source-receiver azimuth and the value of the source-receiver azimuth about which the selected attribute exhibits mirror symmetry.

16. The method of claim 15, wherein step (e) comprises determining a value of $\phi_0$ that gives a value for the function indicative of the correspondence between the selected source-receiver azimuth and the value of the source-receiver azimuth about which the selected attribute exhibits mirror symmetry that is lower than a pre-set value.

17. The method of claim 12, further comprising:
   d) selecting another attribute of the geophysical data that is dependent on the source-receiver azimuth; and
   e) determining a value of the source-receiver azimuth about which the another selected attribute exhibits mirror symmetry.

18. The method of claim 17, further comprising the step of determining a value of the azimuth of a mirror symmetry plane within the earth from the value of the source-receiver azimuth about which the selected attribute exhibits mirror symmetry and from the value of the source-receiver azimuth about which the another selected attribute exhibits mirror symmetry.

19. The method of claim 12, wherein the attribute is selected from the arrival time, the polarisation angle, the transverse component, the polarity, the temporal frequency, the amplitude or the linearity of acquired seismic energy.

20. The method of claim 12, further comprising controlling subsequent processing steps on the basis of the determined mirror symmetry plane.

21. The method of claim 12, further comprising an initial step of acquiring at least a first set of geophysical data with a first source-receiver azimuth and a second set of geophysical data with a second source-receiver azimuth different from the first source-receiver azimuth.

22. The method of claim 12, wherein the geophysical data are seismic data.

23. A storage medium encoded with instructions that, when executed by a programmable data processor, perform a method of processing geophysical data, the data comprising at least a first set of geophysical data acquired with a first source-receiver azimuth and a second set of geophysical data acquired with a second source-receiver azimuth different from the first source-receiver azimuth, the method comprising:

a) selecting an attribute of the geophysical data that is dependent on the source-receiver azimuth;

b) determining a value of the source-receiver azimuth about which the selected attribute exhibits mirror symmetry using a function indicative of a correspondence between a selected source-receiver azimuth and the value of the source-receiver azimuth about which the selected attribute exhibits mirror symmetry, wherein the function is expressed as:

$$E = \sum_{i=1}^{n} (f_i - f[-\phi + \phi_0])^2 + (f_i - f[180 - \phi + \phi_0])^2 + (f_i - f[180 + \phi - \phi_0])^2$$

where $f_i$ is the value of the selected attribute at a source-receiver azimuth $\phi$, and $f[\alpha]$ is the value of the attribute at a source-receiver azimuth $\alpha$, $\phi_0$ is the value of the source-receiver azimuth about which the selected attribute exhibits mirror symmetry; and c) storing the value of the source-receiver azimuth about which the selected attribute exhibits mirror symmetry to memory.

24. The storage medium of claim 23, wherein step (b) in the encoded method comprises determining a respective value of the selected attribute from each set of geophysical data.

25. The storage medium of claim 23, wherein the determining step in the encoded method further comprises d) calculating a function indicative of the variation between the value of the selected attribute at a first source-receiver azimuth ($\phi-\phi_0$) and the value of the selected attribute at a second source-receiver azimuth ($\phi_0-\phi$) where $\phi_0$ is the azimuth of a mirror symmetry plane, and e) determining a value of $\phi_0$ that minimizes the value of the function indicative of the correspondence between the selected source-receiver azimuth and the value of the source-receiver azimuth about which the selected attribute exhibits mirror symmetry.

26. The storage medium of claim 23, wherein the encoded method further comprises:

d) selecting another attribute of the geophysical data that is dependent on the source-receiver azimuth; and e) determining a value of the source-receiver azimuth about which the another selected attribute exhibits mirror symmetry.

27. The storage medium of claim 23, wherein the attribute is selected in the encoded method from the arrival time, the polarisation angle, the transverse component, the polarity, the temporal frequency, the amplitude or the linearity of acquired seismic energy.

28. The storage medium of claim 23, the encoded method further comprises an initial step of acquiring at least a first set of geophysical data with a first source-receiver azimuth and a second set of geophysical data with a second source-receiver azimuth different from the first source-receiver azimuth.

29. The storage medium of claim 23, wherein the geophysical data are seismic data.

30. The storage medium of claim 23, further comprising locating a mirror symmetry plane within the earth from the determined value.

31. The storage medium of claim 30, wherein the encoded method further comprises controlling subsequent processing steps on the basis of the located mirror symmetry plane.

32. An apparatus, comprising:

a programmable data processor;

a storage accessible by the programmable data processor; and a program residing on the storage that, when executed by the programmable data processor performs a method of processing geophysical data, the data comprising at least a first set of geophysical data acquired with a first source-receiver azimuth and a second set of geophysical data acquired with a second source-receiver azimuth different from the first source-receiver azimuth, the method comprising:

a) selecting an attribute of the geophysical data that is dependent on the source-receiver azimuth;

b) determining a value of the source-receiver azimuth about which the selected attribute exhibits mirror symmetry using a function indicative of a correspondence between a selected source-receiver azimuth and the value of the source-receiver azimuth about which the selected attribute exhibits mirror symmetry, wherein the function is expressed as:

$$E = \sum_{i=1}^{n} (f_i - f[-\phi + \phi_0])^2 + (f_i - f[180 - \phi + \phi_0])^2 + (f_i - f[180 + \phi - \phi_0])^2$$

where $f_i$ is the value of the selected attribute at a source-receiver azimuth $\phi$, and $f[\alpha]$ is the value of the attribute at a source-receiver azimuth $\alpha$, $\phi_0$ is the value of the source-receiver azimuth about which the selected attribute exhibits mirror symmetry; and c) storing the value of the source-receiver azimuth about which the selected attribute exhibits mirror symmetry to memory.

33. The apparatus of claim 32, wherein step (b) in the encoded method comprises determining a respective value of the selected attribute from each set of geophysical data.

34. The apparatus of claim 32, wherein the determining step in the encoded method further comprises d) calculating a function indicative of the variation between the value of the selected attribute at a first source-receiver azimuth ($\phi-\phi_0$) and the value of the selected attribute at a second source-receiver azimuth ($\phi_0-\phi$) where $\phi_0$ is the azimuth of a mirror symmetry plane, and e) determining a value of $\phi_0$ that minimizes the value of the function indicative of the correspondence between the selected source-receiver azimuth and the value of the source-receiver azimuth about which the selected attribute exhibits mirror symmetry.

35. The apparatus of claim 32, wherein the encoded method further comprises:

d) selecting another attribute of the geophysical data that is dependent on the source-receiver azimuth; and e) determining a value of the source-receiver azimuth about which the another selected attribute exhibits mirror symmetry.

36. The apparatus of claim 32, wherein the attribute is selected in the encoded method from the arrival time, the polarisation angle, the transverse component, the polarity, the temporal frequency, the amplitude or the linearity of acquired seismic energy.

37. The apparatus of claim 32, further comprising locating a mirror symmetry plane within the earth from the determined value.

38. The apparatus of claim 37, wherein the encoded method further comprises the controlling subsequent processing steps on the basis of the determined mirror symmetry plane.

39. The apparatus of claim 32, the encoded method further comprises an initial step of acquiring at least a first set of geophysical data with a first source-receiver azimuth and a second set of geophysical data with a second source-receiver azimuth different from the first source-receiver azimuth.

40. The apparatus of claim 32, wherein the geophysical data are seismic data.

* * * * *